(12) United States Patent
Genest

(10) Patent No.: US 6,799,567 B1
(45) Date of Patent: Oct. 5, 2004

(54) BARBEQUE GRILL CONSTRUCTION

(76) Inventor: Kerry Genest, 8619-175 Street, Edmonton, Alberta Province (CA), T5T 0M3

( * ) Notice: Subject to any disclaimer, the term of this patent is extended or adjusted under 35 U.S.C. 154(b) by 0 days.

(21) Appl. No.: 10/418,770

(22) Filed: Apr. 18, 2003

(51) Int. Cl.[7] .................................................. F24B 3/00
(52) U.S. Cl. .................. 126/30; 126/25 A; 126/25 AA; 126/26
(58) Field of Search ................................ 126/26, 25 R, 126/30, 25 A, 25 AA, 9 R, 9 B, 275 R

(56) References Cited

U.S. PATENT DOCUMENTS

| | | | | |
|---|---|---|---|---|
| 2,827,846 A | * | 3/1958 | Karkling ....................... 99/339 |
| 3,094,113 A | * | 6/1963 | Avila ............................ 126/30 |
| 3,498,210 A | * | 3/1970 | O'Toole ....................... 99/357 |
| 4,054,123 A | * | 10/1977 | Corter ......................... 126/505 |
| 4,162,650 A | | 7/1979 | Davis et al. .................. 99/419 |
| 4,363,313 A | | 12/1982 | Smith .......................... 126/9 R |
| 5,094,223 A | | 3/1992 | Gonzalez .................. 126/25 R |
| 5,183,027 A | | 2/1993 | Saldana ..................... 126/25 R |
| 5,287,844 A | | 2/1994 | Fieber ......................... 126/30 |
| D358,204 S | | 5/1995 | Ferrier ....................... D23/314 |
| 5,481,964 A | | 1/1996 | Kitten ......................... 99/339 |
| D383,029 S | | 9/1997 | Strelcheck, Jr. et al. ..... D7/332 |
| 6,006,740 A | | 12/1999 | Ulrickson et al. ............. 126/29 |

* cited by examiner

Primary Examiner—Alfred Bashichas
(74) Attorney, Agent, or Firm—Sturm & Fix LLP

(57) ABSTRACT

A wood burning barbecue grill construction 10 including a base member 20 optionally mounted on a support post 90 and dimensioned to receive an enlarged hollow cylindrical container member 30 and a support column 40 provided with a stop collar 41 that rotatably supports a first swivel collar element 52 fixedly secured to a grill member 50 having a barred grill portion 53 and a flat grill portion 54 and a warming plate 60 rotatably suspended above said grill member 50 via a second swivel collar element.

19 Claims, 2 Drawing Sheets

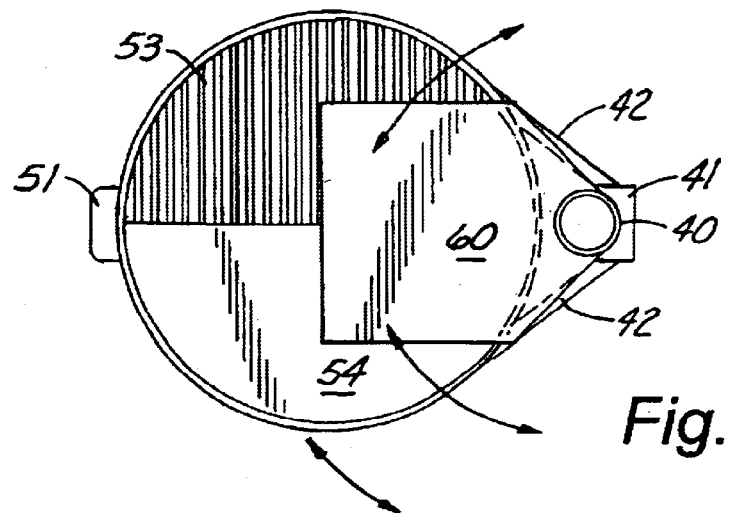
Fig. 3
Fig. 4
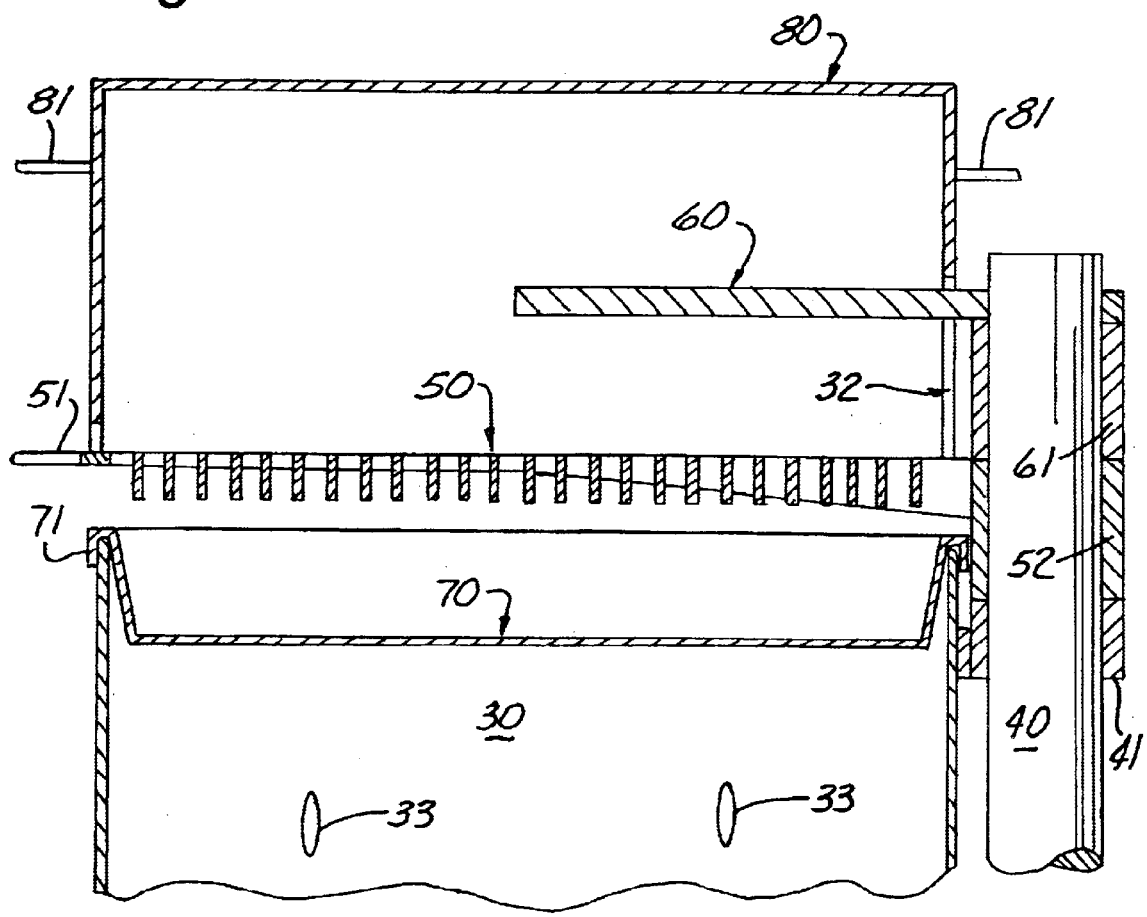

BARBEQUE GRILL CONSTRUCTION

CROSS REFERENCE TO RELATED APPLICATIONS

BACKGROUND OF THE INVENTION

1. Field of the Invention

The present invention relates to the field of barbeque grills in general and in particular to a wood burning barbeque grill construction having a plurality of cooking components that are adapted to be selectively rotated into position relative to the heat source.

2. Description of Related Art

As can be seen by reference to the following U.S. Pat. Nos. 4,363,313; 6,006,740; 5,287,844; 5,183,027; and 5,094,223, the prior art is replete with myriad and diverse barbecue grill constructions.

While all of the aforementioned prior art constructions are more than adequate for the basic purpose and function for which they have been specifically designed, they are uniformly deficient with respect to their failure to provide a simple, efficient, and practical wood burning fire pit that can also be employed for cooking purposes.

In today's high-tech and fast paced society, increasing numbers of North Americans are returning to nature and the basics of life in order to promote physical and mental well being. There are many reasons for this "back to the basics" trend, ranging from tough economic times to problems in schools and family structure, to simply feeling the need to slow down and enjoy life during this era of rapid technological growth and societal change. Regardless of the reason, the effects of this trend are influencing our attitudes and activities during our very valuable leisure time.

The simplicity and calm of the outdoors help to erase the tensions of modern life with an atmosphere which encourages family interaction and relaxation. Camping and its "instant" substitute, the backyard barbecue, have been enjoyable sources of outdoor recreation for many years. An important component in the creation of a socially attractive and comfortable outdoor atmosphere is an open fire. Fire can be a great source of comfort. Everyone is fascinated by it and few can ignore the beauty or escape the hypnotic effect of watching a fire bum. Fire has served man well since the beginning of time, keeping him warm, cooking his food, and keeping wild animals away.

Outdoor cooking is also an important part of summer entertainment, with most North American households owning either a gas barbecue, grill, or other type of outdoor cooking appliance. Although the gas barbecue has grown in popularity in recent years due to the increased levels of ease with which they can now be lit and operated, many still prefer the taste and the thrill of cooking over an open fire. A new product has been designed to incorporate the practical cooking grills into a wood burning fire pit. Although many campers are familiar with similar products found in commercial campgrounds, such items have remained out of reach to the general population. Those who enjoy the experience of outdoor cooking and sitting around a campfire may now enjoy both in the convenient location of their own backyards.

As a consequence of the foregoing situation, there has existed a longstanding need for a new and improved type of wood burning barbecue grill construction that will function both as a portable fire pit or portable grill that can be fueled by either wood or charcoal and the provision of such a construction is the stated objective of the present invention.

BRIEF SUMMARY OF THE INVENTION

Briefly stated, the barbecue grill construction that forms the basis of the present invention comprises in general a base unit, fire pit unit, a grill unit, a warming unit, as well as an optional wind deflector and a charcoal holder for those times when wood is not used as the primary fuel source.

While many North American householders have installed gas fire pits in their yards to create a beautiful summer evening ambiance for outdoor entertaining, these units are not designed to be used for cooking. The grill construction of the invention on the other hand, provides a flat plate grill and barred grill, as well as a warming plate, all of which can be swung easily over or away from the flames of the fire. The cooking trays are attached to a pivot post at the side of the approximately two foot diameter fire pit. Family and friends can all gather around the circular pit to stay warm as the sun goes down and watch the fire while waiting for their food to cook With this method of cooking, there is no need for one individual to stand over by the propane tank or gas line to cook the meal away from the others. Instead, everyone can participate in cooking the meal while sitting together around a warm, inviting fire.

This invention also provides an added measure of safety and security for open fires whether camping or picnicking in the wilderness or simply spending the evening in the backyard. The heating cylinder is mounted on a base member that can be either pedestal mounted or secured directly into the ground, either of which method contains the flames with at least a two foot high barrier. It positions the grills at a comfortable level for cooking while sitting down, rather than having to stand. It also allows the fire to be enjoyed at the same time.

Installed in commercial campsites and parks, this invention will provide valuable leisure time enjoyment for the more than 60 million North Americans who go camping in the wilderness every year, as well as the countless others who go out on day trips for picnics to provincial and municipal parks. It will also provide years of unlimited enjoyment for city dwellers and those with small vacation spots and cabins.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 3 is a top plan view showing the grill unit and the warming unit positioned over the fire pit unit; and, FIG. 4 is a cross-sectional view of the upper portion of the grill construction.

DETAILED DESCRIPTION OF THE INVENTION

Figure 1:
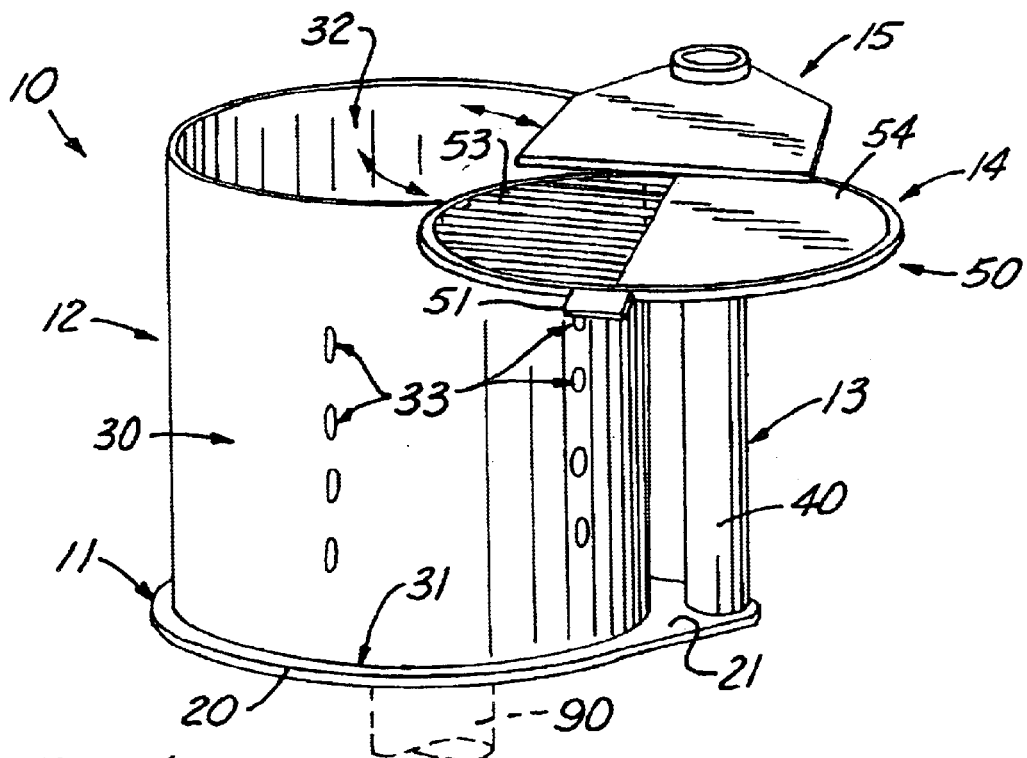
FIG. 1 is a perspective view of the grill construction with both the grill unit and the warming unit pivoted away from the fire pit unit.

As can be seen by reference to the drawings, and in particular to FIG. 1, the barbecue grill construction that forms the basis of the present invention is designated generally by the reference number 10. The grill construction 10 comprises in general a base unit 11, a fire pit unit 12, a support unit 13, a grill unit 14, and a warming unit 15. These units will now be described in seriatim fashion.

As can best be seen by reference to FIG. 1, the base unit 11 comprises a generally tear drop shaped rigid base member 20 preferably fabricated from steel or other strong fireproof material 21.

Figure 2:
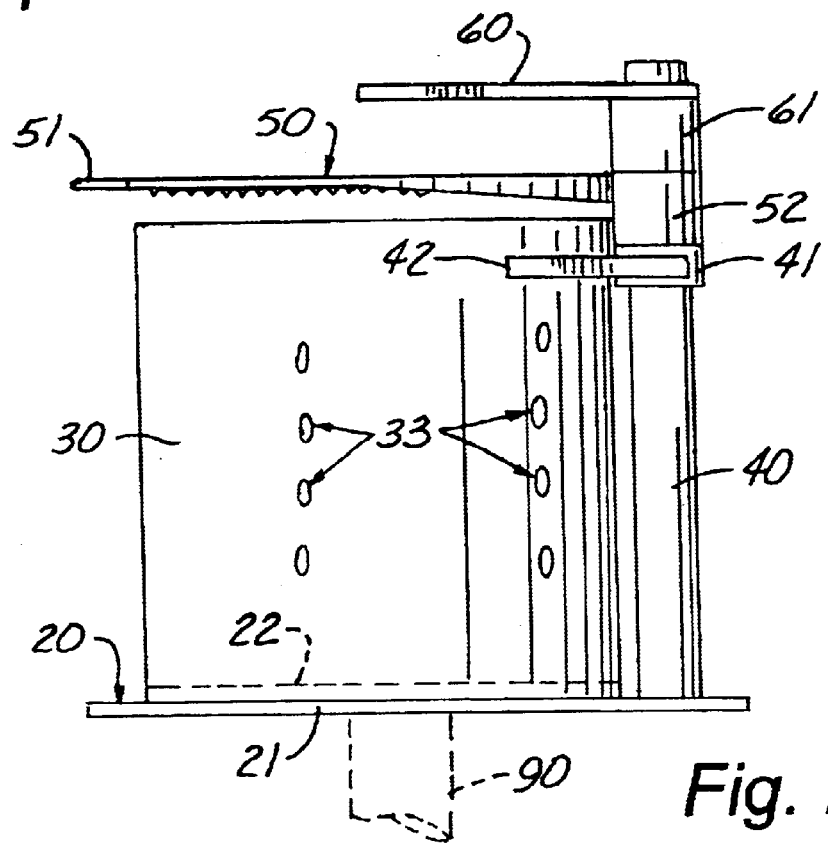
FIG. 2 is a side elevation view of the grill construction with both the grill unit and warming unit positioned over the fire pit unit.

As shown in FIGS. 1 and 2, the fire pit unit 12 comprises in general an enlarged hollow cylindrical container member 30 that may be either fixedly secured on its lower end 31 to the enlarged portion of the tear drop shaped base member 20 as depicted in FIG. 1, or releasably engaged with a raised disc shaped projection 22 formed on the enlarged portion of the base member 20 and depicted in phantom in FIG. 2.

In addition, the cylindrical container member 30 is further provided with an open top 32 and a plurality of discrete apertures 33 formed in the sides thereof to permit air flow into the interior of the container member 30.

Still referring to FIGS. 1 and 2, it can be seen that the support unit 13 comprises a vertical support column 40 fixedly secured and projecting upwardly from the narrow end of the tear drop shaped base member 20; wherein the support column 40 is disposed proximate to and projects above the top of the container member 30 for reasons that will be explained presently.

Turning now to FIGS. 2 and 3, it can be seen that the support column 40 is provided with a stop collar 41 that is fixedly connected to the container member 30 via a pair of support arms 44 to form a bearing surface for the grill unit 14.

As shown in FIGS. 1 through 4, the grill unit 14 comprises a generally circular grill member 50 that is dimensioned to overlie the top opening 32 in the container member 30 wherein the outboard end of the grill member 50 is provided with a handle element 51 and the inboard end of the grill member 50 is provided with a first swivel collar element 52 that is slidably received on the support column 40 and rotatably supported by the stop collar 41.

In addition, the grill member 50 is further provided with a semi-circular based grill portion 53 and a semi-circular flat grill portion 54 which are joined together along a diameter aligned with the handle element 51 and the swivel collar element 52 so that each individual grill portion 53 54 may be selectively positioned over the top of the container member opening 32 depending upon the type of food that is being prepared.

Still referring to FIGS. 1 through 4, it can be seen that the warming unit 15 comprises a warming plate 60 disposed in a cantilevered fashion relative to a second swivel collar element 61 which is slidably received by the support column 40 and which is rotatably supported by the first swivel collar element 52 on the grill member 50.

In addition, as can be seen in particular by reference to FIG. 4, the grill construction 10 also contemplates the use of a charcoal pan insert 70 having a peripheral lip 71 that is dimensioned to engage the top of the container member; and, a windscreen cover 80 having a pair of handle elements 81 and an enlarged opening 82 that is dimensioned to receive the inboard end of the warming plate 60.

The charcoal pan insert 70 is provided so that the user can grill food over a bed of charcoal positioned beneath the barred grill portion 53 of the grill member 60 and the windscreen cover 80 is provided not only to retain heat above the grill member 50 during cooking, but also to act as a spark arrester when burning wood during windy conditions.

It should also be noted that this invention further contemplates placing the base member 20 on a pedestal 90 as depicted in phantom in FIGS. 1 and 2 to elevate the grill construction 10 to a suitable height for cooking, etc.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A barbecue grill construction comprising:

a base member having an outboard end and an inboard end, the base member adapted to receive combustible fuel a fire pit including an enlarged hollow cylindrical container member, having an open top and bottom, wherein the open bottom is adapted to removeably rest on the base member and enclose the combustible fuel a support unit including an elongated support column disposed on the inboard end of the base member a stop collar operatively associated with and disposed in a surrounding relationship relative to the support column a grill unit including a grill member having an outboard end provided with a handle element and an inboard end provided with a first swivel collar element dimensioned to receive the support columns and to be rotatably supported by said stop collar.

2. The construction as in claim 1; further comprising a warming unit including a warming plate disposed in a cantilevered fashion relative to a second swivel collar element that is dimensioned to receive the support column end to be rotatably supported by said first swivel collar element.

3. The construction as in claim 2; wherein, at least a portion of the grill member is provided with a barred grill portion.

4. The construction as in claim 2; wherein at least a portion of the grill member is provided with a barred grill portion.

5. The construction as in claim 2; wherein one portion of the grill member is provided with a barred grill portion and the remaining portion of the grill member is provided with a flat grill portion.

6. The construction as in claim 2; wherein, the grill member has a generally flat circular configuration and is further provided with a semi-circular barred grill portion and a semi-circular flat grill portion.

7. The construction as in claim 6; wherein, the juncture between the barred grill portion and the flat grill portion is aligned along a diameter that extends between the handle element and the first swivel collar element.

8. The construction as in claim 1; wherein, said stop collar is fixedly secured to said container member.

9. The construction as in claim 1; further including a charcoal pan insert adapted to be releasably received in the upper portion of the container member.

10. The construction as in claim 1; wherein, said container member is further provided with a plurality of discrete air flow apertures.

11. The construction as in claim 10; wherein, said container member is further provided with a plurality of discrete air flow apertures.

12. The construction as in claim 1; further including a windscreen cover dimensioned to fit over said warming plate and said grill member.

13. The construction as in claim 1; further comprising a charcoal pan inset adapted to be releasably received in the upper portion of the container member.

14. The construction as in claim 9; further including a windscreen cover dimensioned to fit over said warming plate and said grill member.

15. The construction as in claim 1; wherein, said base member has a generally tear drop shaped configuration.

16. The construction as in claim 15; wherein, said container member is disposed on the enlarged portion of the base member and the support column is disposed on the narrow portion of the base member.

17. The construction as in claim 1; wherein, the base member is mounted on a support post.

18. The construction as in claim 1; wherein, said container member is fixedly secured to the base member.

19. The construction as in claim 1; wherein, said container member is removably associated with the base member.

* * * * *